United States Patent
Croce et al.

(10) Patent No.: US 6,721,927 B2
(45) Date of Patent: Apr. 13, 2004

(54) SUBSTITUTING HIGH PERFORMANCE AND LOW POWER MACROS IN INTEGRATED CIRCUIT CHIPS

(75) Inventors: Peter F. Croce, Essex Junction, VT (US); Steven M. Eustis, Essex Junction, VT (US); Yabin Wang, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 10/063,213

(22) Filed: Mar. 29, 2002

(65) Prior Publication Data

US 2003/0188266 A1 Oct. 2, 2003

(51) Int. Cl.$^7$ .............................................. G06F 17/50
(52) U.S. Cl. ........................ 716/4; 716/2; 716/7; 716/8; 716/17
(58) Field of Search ................ 716/4, 2, 7, 8, 716/12, 17

(56) References Cited

U.S. PATENT DOCUMENTS

| | | | | |
|---|---|---|---|---|
| 4,815,003 A | * | 3/1989 | Putatunda et al. .............. 716/9 |
| 5,225,991 A | * | 7/1993 | Dougherty ...................... 716/9 |
| 5,473,548 A | * | 12/1995 | Omori et al. ................... 716/6 |
| 5,583,788 A | * | 12/1996 | Kuribayashi .................. 716/14 |
| 5,648,910 A | * | 7/1997 | Ito ................................. 716/2 |
| 5,748,490 A | * | 5/1998 | Viot et al. ...................... 716/3 |
| 5,774,367 A | * | 6/1998 | Reyes et al. ................... 716/2 |
| 5,796,129 A | | 8/1998 | Minuzo ....................... 257/206 |
| 6,266,798 B1 | * | 7/2001 | Kanazawa et al. ............. 716/4 |
| 6,285,590 B1 | | 9/2001 | Poplevine et al. ..... 365/185.21 |
| 6,301,696 B1 | | 10/2001 | Lien et al. ..................... 716/16 |
| 6,308,309 B1 | * | 10/2001 | Gan et al. ...................... 716/8 |
| 6,397,170 B1 | * | 5/2002 | Dean et al. ................... 703/14 |
| 6,438,731 B1 | * | 8/2002 | Segal ............................. 716/2 |
| 6,467,068 B1 | * | 10/2002 | Iyer et al. ...................... 716/6 |
| 6,477,687 B1 | * | 11/2002 | Thomas ......................... 716/8 |
| 6,496,965 B1 | * | 12/2002 | van Ginneken et al. ...... 716/10 |
| 6,502,226 B2 | * | 12/2002 | Ishikura ......................... 716/7 |
| 6,543,036 B1 | * | 4/2003 | Iyer et al. ...................... 716/6 |
| 6,598,215 B2 | * | 7/2003 | Das et al. ..................... 716/12 |
| 2001/0025364 A1 | * | 9/2001 | Kaneko ......................... 716/1 |
| 2002/0133791 A1 | * | 9/2002 | Cohn et al. .................... 716/4 |
| 2002/0133792 A1 | * | 9/2002 | Raghunathan et al. ......... 716/4 |
| 2002/0147959 A1 | * | 10/2002 | Srikantam .................... 716/18 |
| 2002/0188918 A1 | * | 12/2002 | Cirit .............................. 716/9 |
| 2003/0088842 A1 | * | 5/2003 | Cirit .............................. 716/9 |
| 2003/0140319 A1 | * | 7/2003 | Bhattacharya et al. ......... 716/2 |

FOREIGN PATENT DOCUMENTS

| | | | |
|---|---|---|---|
| JP | 2097058 A | 4/1990 | ........... H01L/27/04 |
| JP | 06195414 A | * 7/1994 | ........... G06F/15/60 |
| JP | 06291190 A | * 10/1994 | ........... H01L/21/82 |
| JP | 10200394 A | * 7/1998 | ......... H03K/19/173 |

OTHER PUBLICATIONS

Benini et al., "Iterative remapping for logic circuit", IEEE Transactions on Computer–Aided Design of Integrated Circuits and Systems, vol. 17, No. 10, pp. 948–964.*

(List continued on next page.)

*Primary Examiner*—Matthew Smith
*Assistant Examiner*—Phallaka Kik
(74) *Attorney, Agent, or Firm*—McGinn & Gibb, PLLC; Richard A. Henkler, Esq.

(57) ABSTRACT

A method of designing an integrated circuit chip includes preparing a first macro to have a first power consumption rate, preparing a second macro to have a second power consumption rate different than the first power consumption rate, designing the circuit, measuring performance characteristics of the circuit, and substituting the second macro for the first macro to improve the performance characteristics. The first macro and the second macro have the same function, devices, surface area size, external wiring pattern, and timing characteristics.

20 Claims, 6 Drawing Sheets

```
30 → HIGH PERFORMANCE              |  LOW POWER         ← 31

32 → (0 0) - ROM OFF, PRECHARGE    |  (0 0) - ROM OFF, ALL GROUND ← 33

34 → (1 0) - ROM ON, READ          |  (1 0) - ROM ON, PRECHARGE ← 35

|  (1 1) - ROM ON, READ    ← 37
```

OTHER PUBLICATIONS

Srikantam et al., "CREAM: combined register and module assignment with floorplanning for low power datapath synthesis", Thirteenth International Conference on VLSI Design, Jan. 3, 2000, pp. 228–233.*

Zhang et al.,"A delay model and optimization method of a low–power BiCMOS logic circuit", IEEE Journal of Solid–State Circui vol. 29, No. 10, Oct. 1994, pp. 1191–1199.*

* cited by examiner

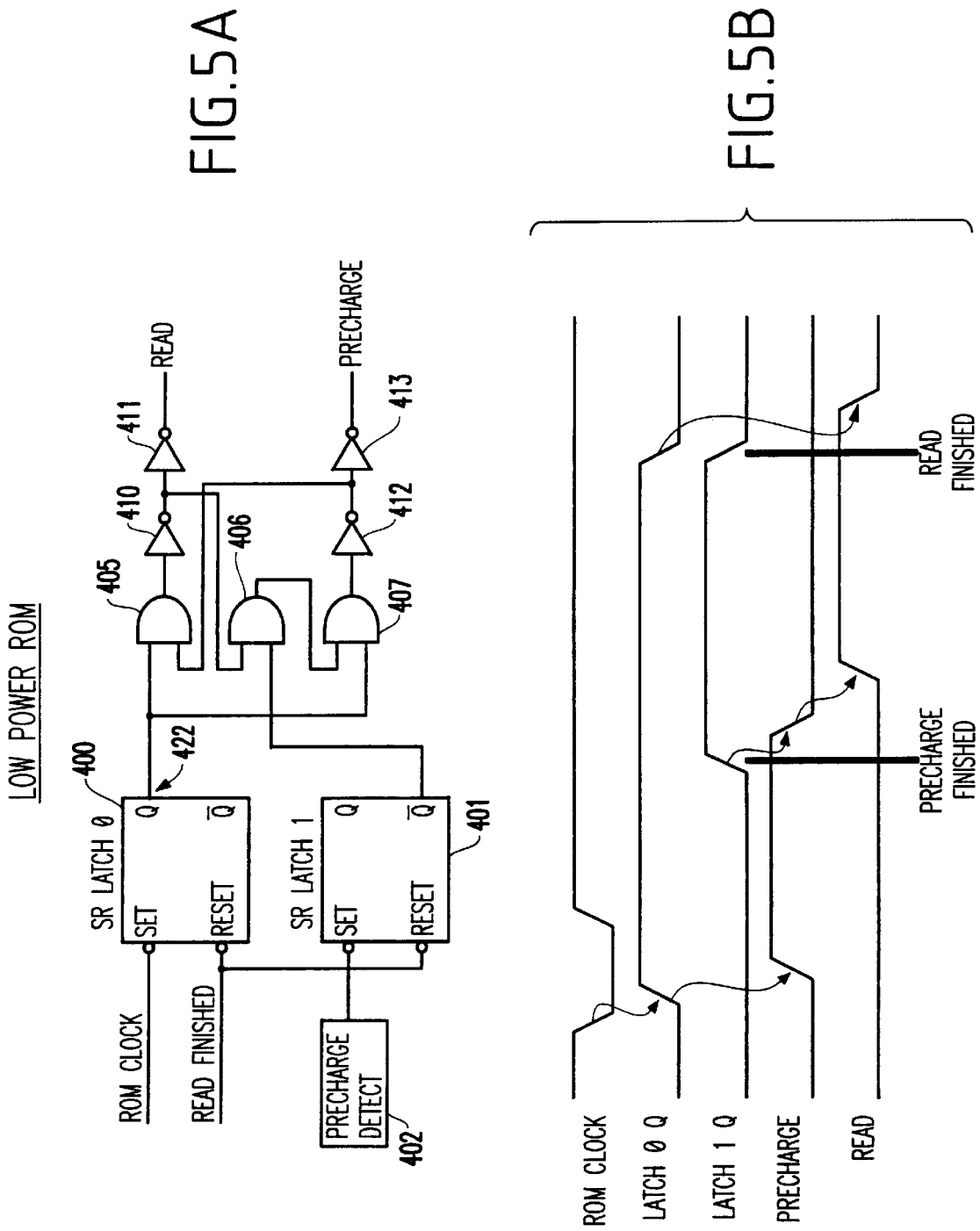

SUBSTITUTING HIGH PERFORMANCE AND LOW POWER MACROS IN INTEGRATED CIRCUIT CHIPS

BACKGROUND OF THE INVENTION

1. Field of the Invention

The present invention generally relates to semiconductor memory circuits and, more particularly, to a semiconductor memory circuit having high performance and low power characteristics.

2. Description of the Related Art

Conventional semiconductor memory circuits, such as ROM (read-only memory) circuits often make a trade-off between two separate architectures; one architecture for high performance characteristics, and the other architecture specific to low power consumption characteristics.

However, conventional devices and methods do not provide both architectures (high performance and low power) that are seamlessly interchangeable within a chip design. For example, in order to reduce the power consumption of a given chip design, a low-power ROM array may be substituted in place of a faster, high-power ROM array (represented as a second macro). In conventional structures, whenever such an architecture change is needed for a macro, the footprint between the two different macros (high power/low power) is often different. The "footprint" is the surface area size of the macro within the circuit.

Even if the footprint is the same, the different macros will have very different timing characteristics. While the higher-power ROM array macro is designed to operate at a higher speed than the lower-power ROM array, there are additional timing differences between the two macros that are referred to as timing characteristics. Timing characteristics are different than the processing speed of the macro. Such timing characteristics relate to the type and number of inputs and outputs, as well as how the inputs and outputs sequence during any particular function. Even if the footprint and timing characteristics are the same, the different macros will have different devices and wiring internal to the macro.

Thus, there remains a need for a new and improved ROM device and method that provides high-power and low-power macros that are seamlessly interchangeable in a chip design. The invention described below provides such a method/structure.

BRIEF SUMMARY OF THE INVENTION

In view of the foregoing and other problems, disadvantages, and drawbacks of the conventional ROM devices, the present invention has been devised, and it is an object of the present invention to provide a structure and method for a ROM designed for selection between a memory device having high speed or a memory device requiring low operating power.

In order to attain the objects suggested above, there is provided, according to one aspect of the invention, a method of designing an integrated circuit chip. The method includes preparing a first macro to have a first power consumption rate, preparing a second macro to have a second power consumption rate different than the first power consumption rate, designing the circuit, measuring performance characteristics of the circuit, and substituting the second macro for the first macro to improve the performance characteristics. The first macro and the second macro have the same function, surface area size, external wiring pattern, and timing characteristics.

The method also includes designing a floorplan for the circuit, calculating the signal timing of the circuit, designing wires to connect elements of the circuit together, and recalculating the signal timing. After the macros are substituted, the method only repeats the recalculating of the signal timing. Also, the substituting of the second macro for the first macro is performed only if the performance characteristics indicate that the substituting would improve the performance characteristics. Such performance characteristics include operating speed, power consumption, etc.

The invention also includes a system for designing integrated circuits that has a first macro having a first power consumption rate and a second macro having a second power consumption rate different than the first power consumption rate. The first macro and the second macro have the same function, devices, surface area size, external wiring pattern, and timing characteristics, and are designed to be seamlessly substituted for one another. The first macro and the second macro comprise a single design having different internal wiring connections between elements within the single design. The different wiring connections change an operating speed and a power consumption of the first macro when compared with the second macro.

BRIEF DESCRIPTION OF THE SEVERAL VIEWS OF THE DRAWINGS

The foregoing and other objects, aspects and advantages will be better understood from the following detailed description of the preferred embodiments of the invention with reference to the drawings, in which:

FIG. 5A is a schematic diagram of a low power ROM circuit in FIG. 3 according to the present invention;

FIG. 5B is a schematic illustration of a timing diagram of a low power ROM circuit according to the present invention.

DETAILED DESCRIPTION OF THE INVENTION

Detailed Description of Preferred Embodiments of the Invention

As mentioned above the power consumption of a portion (e.g., a macro) of an integrated circuit can be modified to consume less power; however, the modified macro will have a slower performance. For example, in ROM macros, the difference between the high and low power architectures relates to how many bitlines are pre-charged and how many states the ROM cycles go through when read. By precharging all lines at every read/write, the higher-speed architecture uses more power; however, since it cycles through less states, it is faster. Therefore, designers must choose between high-speed and low-power architectures.

The invention facilitates switching between these two different types of macro architectures by designing both memory arrays to have the same function, footprint, devices, external wiring design, and timing characteristics. Therefore, with the invention, one macro (architecture) can be easily substituted for another macro without having to rewire, re-time, or change physical spacing of the remaining structures within the chip. This is shown below with respect to FIGS. 1A–6.

Figure 1A:
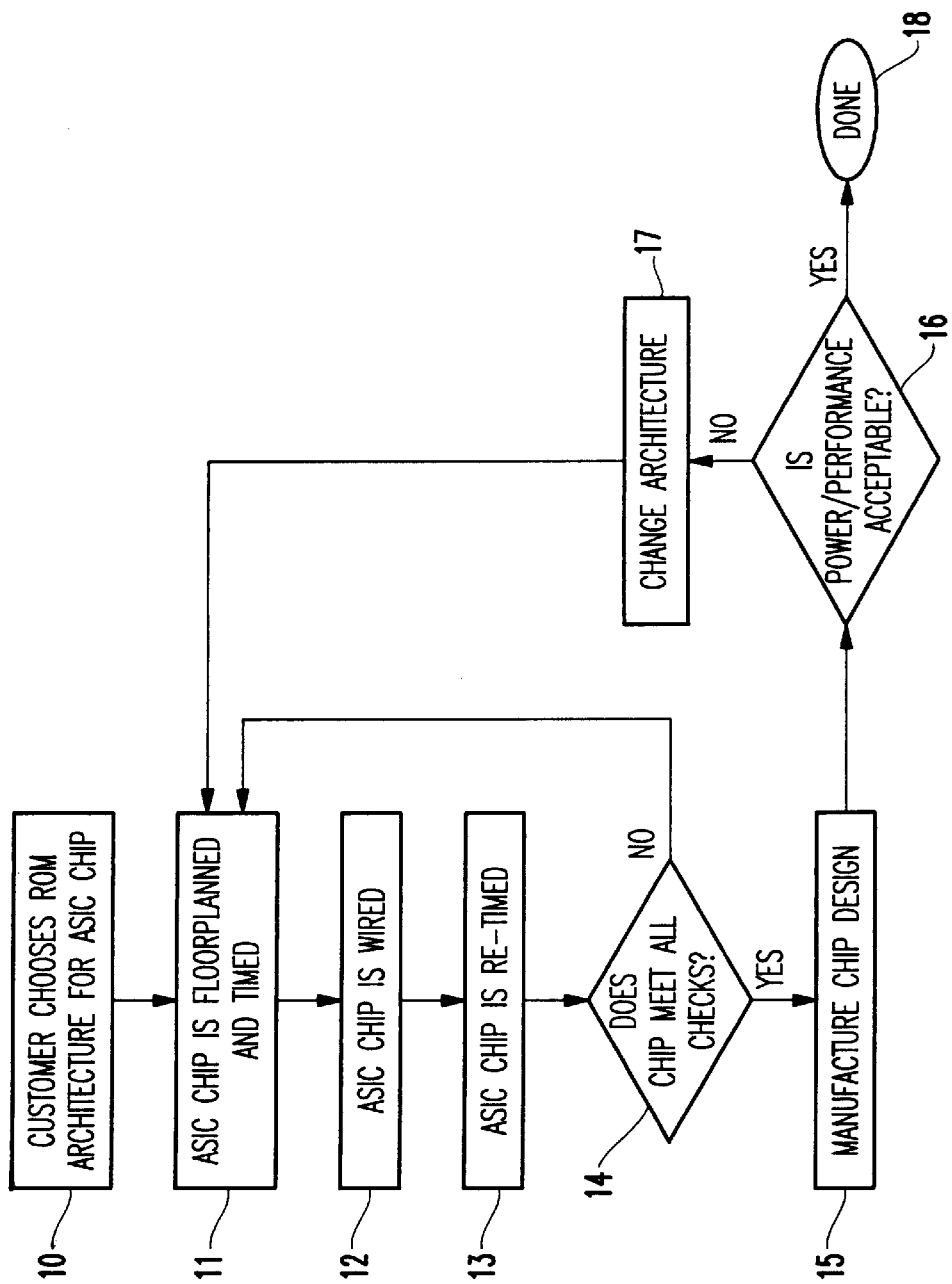
FIGS. 1A and 1B are flow diagrams of processes of modifying a design.
Figure 1B:
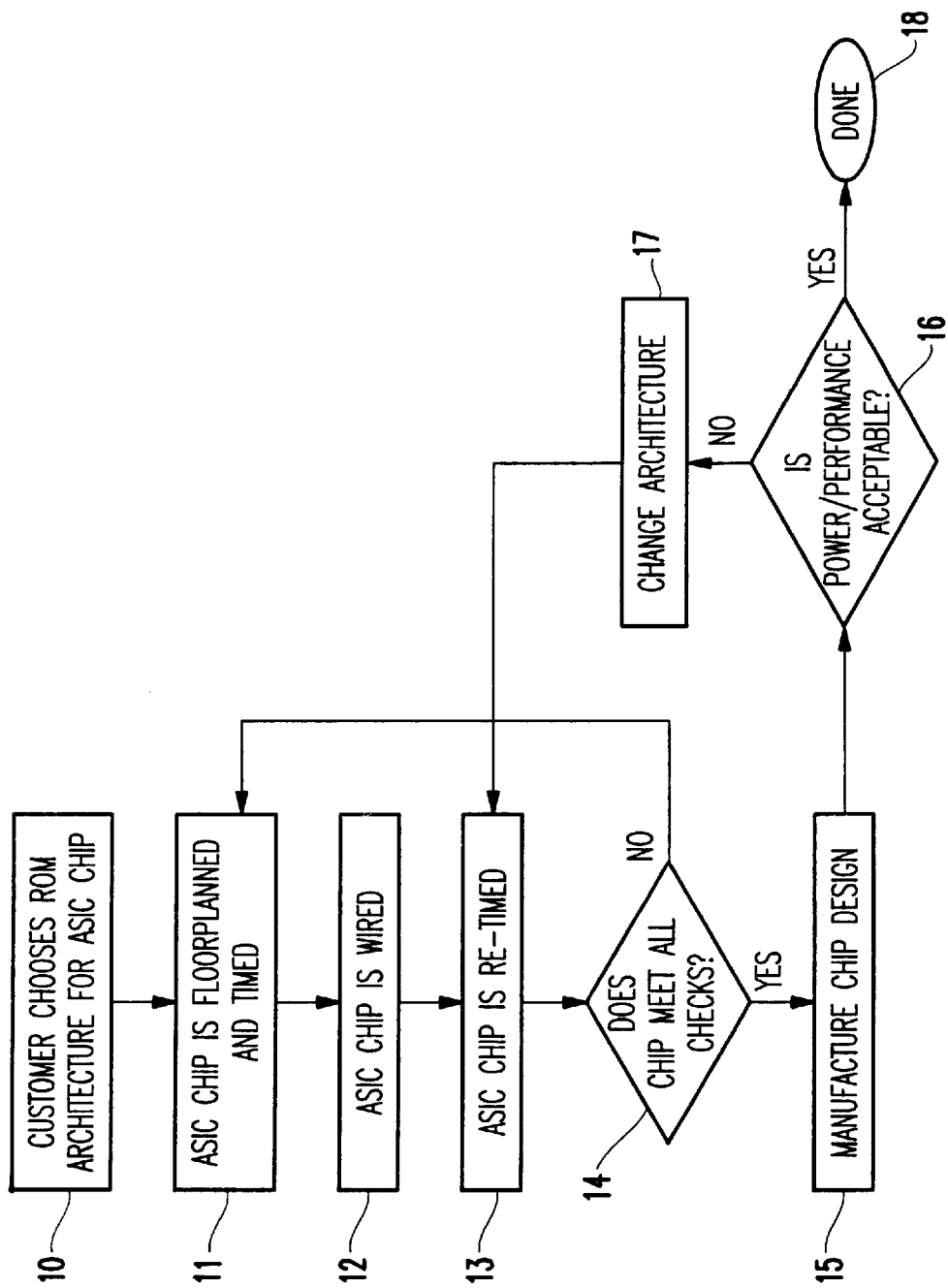

FIG. 1A illustrates that, after a specific ROM architecture is chosen 10 for an ASIC (Application Specific Integrated Circuit) chip, the ASIC chip is floorplanned and timed 11. The process of "floorplanning" involves allocating space on the chip for the different devices that are to be included within the chip, such as a memory array. The timing process determines whether the signals being transmitted between various devices (macros) on the chip are in the proper order, and whether the signals are received within a sufficient time period to allow the chip to function according to the design requirements. Next, the ASIC chip is wired 12 and re-timed 13. The wiring process involves selecting the number of wires that will be needed, the positions of the wires, and the size of the wires to properly allow the different devices to communicate with one another across the chip. After the chip is wired, the timing of the signals must be rechecked because the actual wiring patterns may cause timing differences which could cause the chip to malfunction.

In item 14, the process checks whether the chip design meets 14 all design specifications. If not, the portion of the design which prevented the chip from attaining the designer's goals is modified (e.g., a macro is replaced or altered) and the chip is sent back to be floorplanned and timed 11 with the modified/substitute macro. If the chip meets 14 all checks, then the chip design is manufactured 15.

In item 16, if the power/performance standards of the manufactured chip are deemed acceptable (meets specifications), then the process is complete 18. Generally, the actual power consumption and performance capabilities of the device are not accurately known until the device is actually manufactured. Thus, the actual manufactured device will provide the best indications of power consumption and performance capabilities. Therefore, this process checks for power/performance characteristics after the device is manufactured in item 15.

If the power/performance standards are not acceptable, then the architecture is changed in item 17. More specifically, if the chip is consuming excessive power, certain devices (macros) can be redesigned to consume less power in item 17. However, as explained above, this may cause the macros to operate slower, have different external wiring connections, use different devices, have a different footprint, and/or have different timing characteristics. Therefore, one aspect of the invention modifies the process shown in FIG. 1A to the process shown in FIG. 1B.

More specifically, this aspect of the invention provides high-power and low-power macros that have the same function, devices, footprint, external wiring connections, and timing characteristics. The lower-power macros will have the same timing characteristics (signal order, reaction between signals, etc.) as the high-power macros, but the low-power macros will operate at a lower speed. Therefore, and shown in FIG. 1B, when the architecture is changed in item 17, instead of having to perform new floorplanning, wiring, and timing; the only modification required is to re-time the circuit (based upon the different operating speed of the new or modified macro). Thus, in FIG. 1B, processing proceeds from item 17 directly into item 13 (and not item 11, as shown in FIG. 1A).

In other words, the invention designs high-power and low-power macros to be seamlessly interchangeable within a circuit design. The macros are designed to have the same timing characteristics (although different operational speeds), the same footprint, and the same wiring connections. The primary differences between the macros are the internal device configurations and connections. The high-power macro will have power-hungry, faster devices, while the low-power macro will have more efficient slower devices and connections. Therefore, the macros can be readily substituted for each other.

The only modification that may be required when substituting the inventive macros for one another relates to re-timing the remainder of the chip to accommodate for the different operational speeds of the macros. However, it may not be necessary to re-time the remainder of the chip, if the high-power macro and low-power macro both deliver the necessary signals within an acceptable time period. Thus, in many situations, the macros may be easily substituted for one another without additional modification to the circuit design.

Therefore, the invention allows the designer the flexibility of substituting lower-performance macros when the higher operating speed of the high-powered macro is not needed. Thus, with the invention, the designer can complete a circuit design and, after testing the completed (and possibly manufactured) circuit, freely substitute macros which do not affect overall circuit performance. Prior to the invention, such substitutions would be extremely difficult because of the changes in external wiring connections, footprint, devices, and/or timing characteristics associated with substituting conventional macros for one another. By making such substitutions with the invention, the designer can reduce power consumption without affecting overall circuit performance.

Figure 2A:
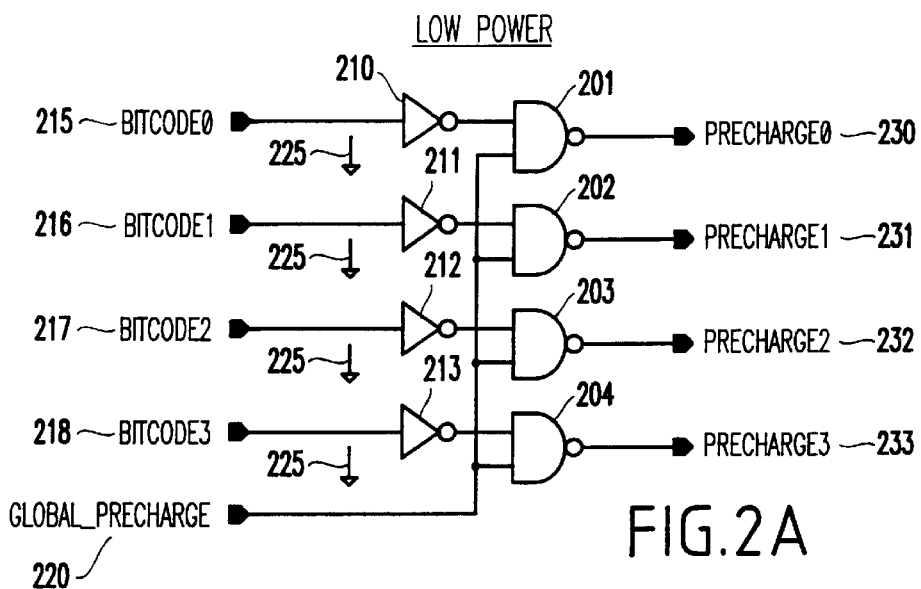
FIGS. 2A and 2B are schematic diagrams of one technique of low and high power memory array designs.
Figure 2B:
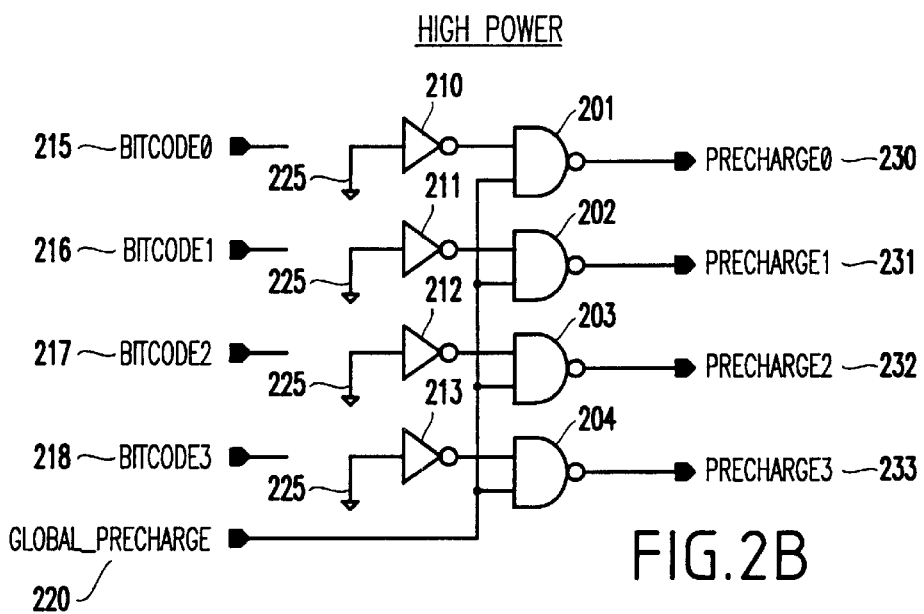

Examples of high-power and low-power macros are shown in FIGS. 2A–2B. FIGS. 2A–2B illustrate portions of a Read Only Memory (ROM) array; however, the invention is not limited to ROM devices. To the contrary, the invention is applicable to all devices (macros) that may be included within an integrated circuit design. Therefore, other types of memory, logic macros, translators, etc. can benefit from the invention. In other words, the invention is broadly applicable to many device macros utilized within an integrated circuit where the device can be written as both a high-power and low-power macro. As mentioned above, an important feature of the invention is that, unlike conventional structures and methods, the invention provides the high-power and low-powered macros with the same footprint, external wiring connections, devices, and timing characteristics.

In FIG. 2A, various bit decode signals 215–218 are input into invertors 210–213 and supplied to NAND circuits 201–204, which output precharged signals 230–233. In FIG. 2A, the global precharge signal 220 only passes through the NAND devices 201–204 when the various bit decode signals 215–218 are grounded. Essentially, because of the invertors 210–213, when a ground signal is placed upon a decode line 215–218, a high signal is supplied to the NAND circuit 201–204, which turns on selected ones of the NAND circuits 201–204 to allow the adjacent precharge line 230–233 to be precharged. Therefore, each of the precharge lines 230–233 are selectively activated depending upon the signals from a bit decode unit connected to the bit decode lines 215–218. This reduces power consumption by eliminating precharging all the precharge lines 230–233 because, in most situations, only a limited number of the precharge lines 230–233 will be precharged.

FIG. 2B illustrates a similar structure that includes differently formed connections, in an otherwise similarly designed structure. In FIG. 2B, all of the inverters 210–213 are grounded through ground lines 225. Therefore, in the high-power structure shown in FIG. 2B, all NAND circuits 201–204 will be activated upon the receipt of a global precharge signal 220. This allows all precharge lines 230–233 to be precharged every cycle. Because all lines are indiscriminately precharged, the precharging can begin as soon as the prior read finishes, while the ROM is in an "off" state. Then, as soon as a new read command is issued, the ROM simply performs a read to the requested address, which is much faster than waiting for only the desired lines to precharge and then read.

As can be seen by comparing FIGS. 2A and 2B, the difference between the macros is the connection of the inverters 210–213 to either a ground 225 or to bit decode lines 215–218. Otherwise, the remaining devices of the macros are identical. This allows both macros to have the same function, the same external wiring connections, the same footprint, the same devices, and the same timing characteristics. Therefore, either macro could be used within a given circuit design, with a simple modification in the circuit design for the different operating speeds of the different macros.

As mentioned above, while the design shown in FIGS. 2A and 2B relate to a ROM array, the invention is not limited only to ROM arrays. To the contrary, one ordinarily skilled in the art would understand that the invention is applicable to all types of macros that are utilized within circuit designs.

Figure 3:
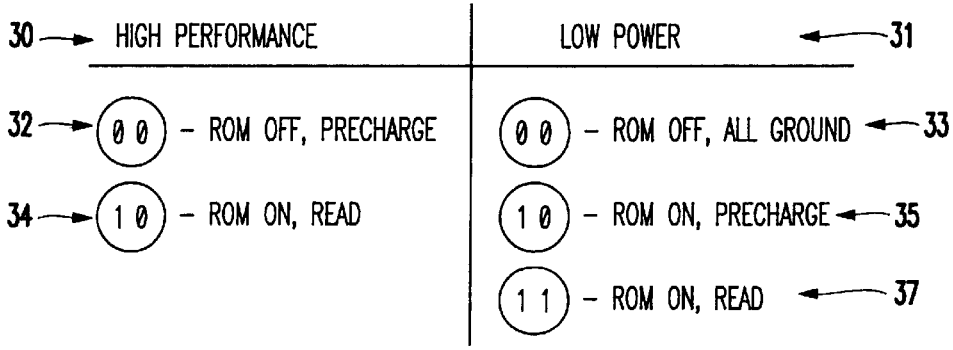
FIG. 3 is a state diagram describing the characteristics of low and high power memory array designs according to the present invention.

Next, as shown in FIG. 3, the high performance macro 30 needs a one-bit state machine and the low power macro 31 needs a two-bit state machine. More specifically, the high-performance (high-power) macro 30 is either off and precharged (0,0) or on and reading (1,0). Thus, the high-power macro 30 only requires a one-bit state machine. To the contrary, with the low-power macro, the device could be off with all devices grounded (0,0), on to precharge selected lines (1,0), or on to read (1,1). Therefore, the low-powered macro requires a two-bit state machine. The second state bit is used only by the low power macro 31 (precharge versus read). Furthermore, the command to read is always tied to the first state bit being on. Additionally, the command to precharge is tied to the first state bit being off for the high performance macro 30 and on for the low power macro 31. Moreover, the second state bit then controls whether precharge or read is happening for the low power design. Also, the same command that turns off the macro resets both state bits. In the high performance ROM 30, the second state bit is always in the reset state and thus does not affect functionality in any way.

In the low power macro 31, the circuit low-power macro detects when the precharge is finished and increments the second state bit, causing the precharge cycle to end and the read cycle to begin. In the high performance macro, the precharge finish is defined by the cycle time.

Figure 4A:
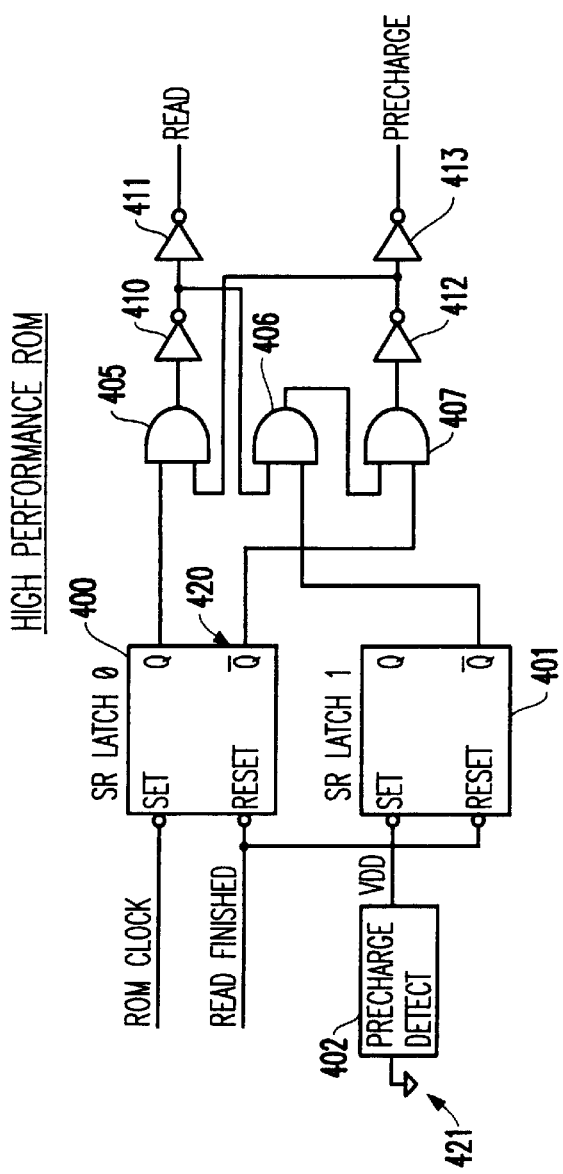
FIG. 4A is a schematic diagram of a high performance ROM circuit in FIG. 3 according to the present invention.

FIGS. 4A–5B illustrate the state diagrams shown in FIG. 3. More specifically, FIG. 4A illustrates latches 400, 401, a precharged detect circuit 402, AND circuits 405–407, and inverters 410–413. This macro is a high-performance macro because the precharge detect circuit 402 is grounded as shown by item 421. In addition, the complement output 420 of the latch 400 is connected to AND circuit 407. FIG. 5A illustrates a substantially similar structure; however the connection between the complement signal 420 and the AND circuit 407 is changed such that the AND circuit 407 is connected to the output Q 422. Further, the precharged detect circuit 402 is no longer grounded in FIG. 5A.

Figure 4B:
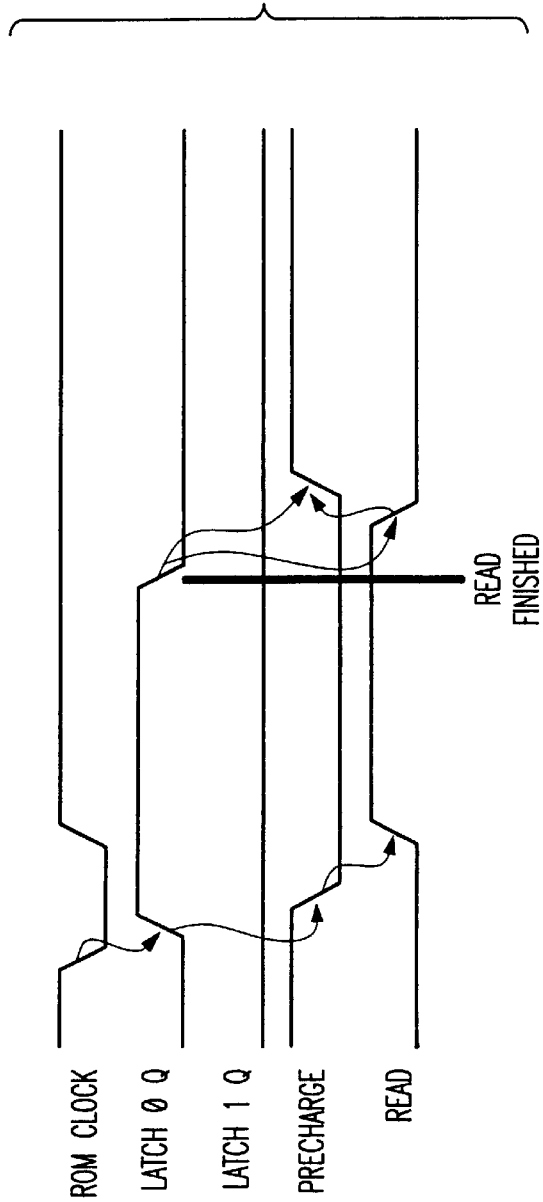
FIG. 4B is a schematic illustration of a timing diagram of a high performance ROM circuit according to the present invention.

As shown by comparing the timing diagrams in FIGS. 4B and 5B, the macro shown in FIG. 4A is read faster than the macro shown in FIG. 5A. The macro in FIG. 4A is essentially wired so that the second state bit, 401, is always low. Thus, when the macro is "off", the state bit 400 is low, causing the precharge to be on. Because all lines are precharged, the macro merely waits for the clock to flip the state bit 400 to VDD and perform a read operation. The macro in FIG. 5A is wired to use both state bits. When both state bits are low, the macro is "off" and both READ and PRECHARGE signals are off. This saves power because there is no leakage current in the array with all signals at ground.

When the clock flips the state bit 400, the precharge operation is first initiated on only the desired lines to be read. When the precharge is finished and detected, the state bit 401 flips and a read operation starts. Thus, power is saved by leaving the array "off" when the macro is off and by only precharging the lines that are to be read. Since the design has to wait to see which lines will be read, it has to wait until the beginning of the cycle to precharge, which causes a performance degradation. The high power macro is faster because it can "hide" its precharge time by performing the precharge operation while the macro is off and the chip is accessing other macros.

Figure 6:
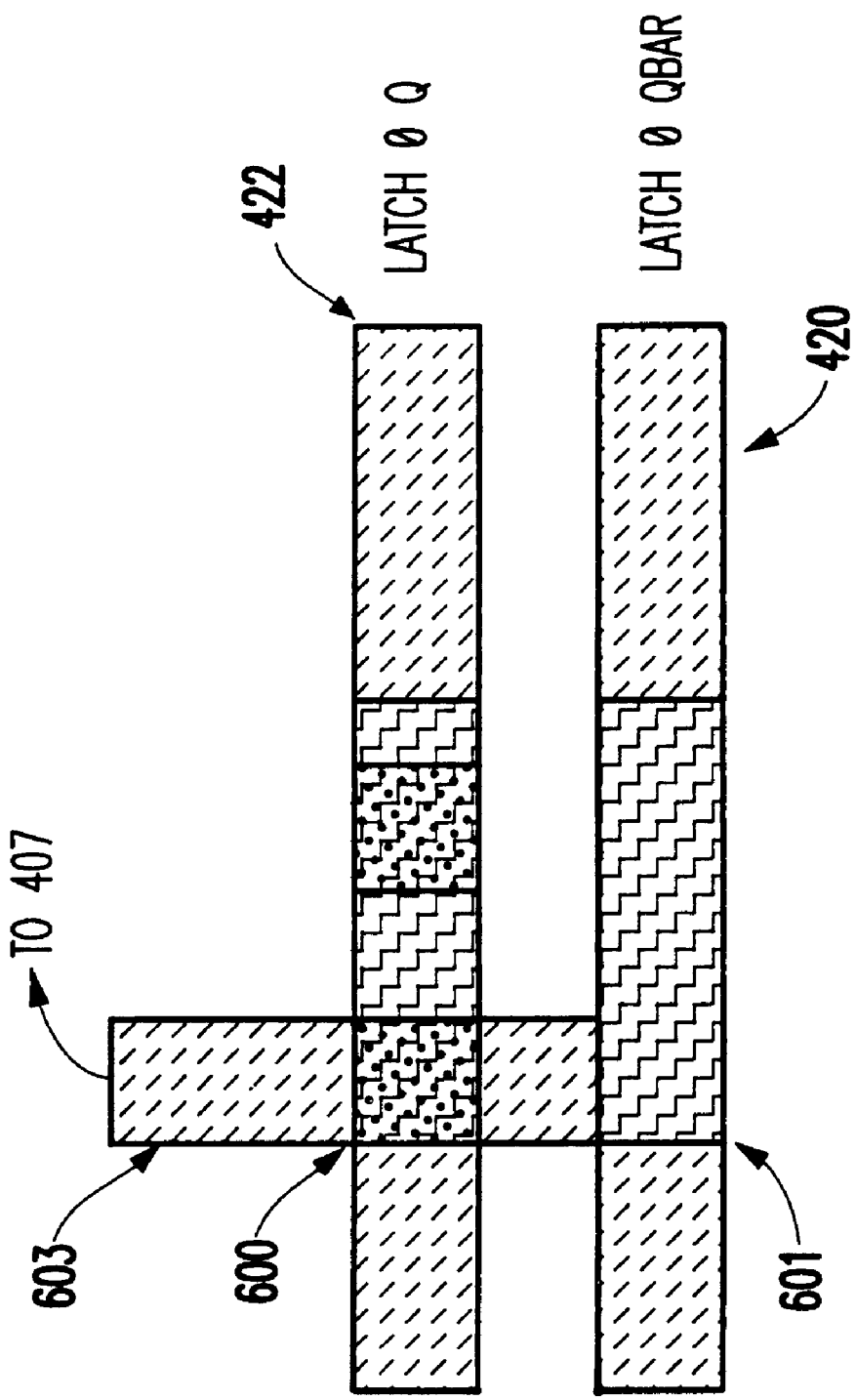
FIG. 6 is a schematic diagram of a ROM circuit device according to the present invention.

FIG. 6 illustrates one example of how the connection of the AND circuit 407 to the latch 400 could be selectively made to either the output Q 422 or complement output QBAR 420. In FIG. 6, schematic illustrations of wires representing items 420 and 422 are shown. In addition, a metal wire 603 which runs to the AND circuit 407 is illustrated as passing at a level above or below the other latch output wires 420, 422. In this illustration, the wire 603 is insulated from the wires 422 and 420 by an intermediate insulating layer. In order to connect wires 603 to wire 422, a conductive via 600 is formed through the intervening insulator. With a conductive via at location 600, the AND circuit 407 would be connected to the latch output Q 422, as shown in FIG. 5A. Alternatively, a via at location 601 would be formed between wire 420 and wire 603 in order to connect the AND circuit 407 to the complementary output QBAR 420 (as shown in FIG. 4A).

Thus, FIGS. 4A–5B provide additional illustrations of the invention's ability to maintain the same footprint, external wiring, devices, and timing characteristics between similar function high and low power macros. The invention merely alters connections within the macro to alter the operating speed and power consumption characteristics of the macro. As explained above, by maintaining the footprint, external wiring, devices, and timing characteristics, the invention allows the designer to readily substitute the different macros, without substantially affecting the remainder of the circuit design.

In the present invention, the two designs truly have the same "black box" and are completely interchangeable in the physical design. Conventionally, whenever an architecture change is needed for a macro, the footprint is often different and the chip has to have floorplanning performed again. In fact, even if the footprint is the same conventionally, the chip must be rewired to meet the significantly different timing requirements with the new macro design.

As mentioned above, an important feature of the invention is that, unlike conventional structures and methods, the invention provides the high-power and low-powered macros with the same footprint, external wiring connections, devices, and timing characteristics. This allows designers (customers) to change architecture type with only a minimal cost and time impact after first prototypes are made during the design phase. Furthermore, according to the present invention, the same devices in both architectures are simply wired differently, thereby creating a design which can use devices that can be shared between the architectures.

As a result of having only internal wiring differences between the designs, only a subset of masks needs to be re-manufactured to accommodate design changes, saving time and cost. Since wiring masks are used at the end of the manufacturing process, a design that is partly manufactured can have its macros swapped, with the time to manufacturing completion being significantly reduced. If a chip design needs the opposite architecture of a macro, design time is saved, since no new chip floorplanning or wiring needs to take place.

While the invention has been described in terms of preferred embodiments, those skilled in the art will recognize that the invention can be practiced with modification within the spirit and scope of the appended claims.

What is claimed is:

1. A method of designing an integrated circuit comprising:
    preparing a first macro to have a first power consumption rate;
    preparing a second macro to have a second power consumption rate different than said first power consumption rate;
    designing said circuit to include said first macro;
    measuring performance characteristics of said circuit; and
    substituting said second macro for said first macro to improve said performance characteristics,
    wherein said preparing processes prepare said first macro and said second macro to have the same function, the same internal devices, and different internal connections.

2. The method in claim 1, wherein said preparing of said first macro and said preparing of said second macro comprises altering wiring connections within a single design.

3. The method in claim 2, wherein said altering of said wiring connections changes an operating speed and a power consumption of said first macro when compared with said second macro.

4. The method in claim 1, wherein said designing of said circuit includes:
    designing a floorplan for said circuit;
    calculating a signal timing of said circuit;
    designing wires to connect elements of said circuit together; and
    recalculating said signal timing.

5. The method in claim 4, wherein after said substituting of said second macro for said first macro, said method only repeats said recalculating of said signal timing.

6. The method in claim 1, wherein said substituting of said second macro for said first macro is performed only if said measuring of said performance characteristics indicates that said substituting would improve said performance characteristics.

7. The method in claim 6, wherein said performance characteristics include operating speed and power consumption.

8. A method of designing an integrated circuit chip comprising:
    preparing a first Read Only Memory (ROM) array macro to have a first power consumption rate;
    preparing a second ROM array macro to have a second power consumption rate different than said first power consumption rate;
    designing said circuit to include said first ROM array macro;
    measuring performance characteristics of said circuit; and
    substituting said second ROM array macro for said first ROM array macro to improve said performance characteristics,
    wherein said preparing processes prepare said first macro and said second macro to have the same function, the same internal devices, and different internal connections.

9. The method in claim 8, wherein said preparing of said first ROM array macro and said preparing of said second ROM array macro comprises altering wiring connections between elements within a single design.

10. The method in claim 9, wherein said altering of said wiring connections changes an operating speed and a power consumption of said first ROM array macro when compared with said second ROM array macro.

11. The method in claim 8, wherein said designing of said circuit includes:
    designing a floorplan for said circuit;
    calculating a signal timing of said circuit;
    designing wires to connect elements of said circuit together; and
    recalculating said signal timing.

12. The method in claim 11, wherein after said substituting of said second ROM array macro for said first ROM array macro, said method only repeats said recalculating of said signal timing.

13. The method in claim 8, wherein said substituting of said second ROM array macro for said first ROM array macro is performed only if said measuring of said performance characteristics indicates that said substituting would improve said performance characteristics.

14. The method in claim 13, wherein said performance characteristics include operating speed and power consumption.

15. A system for designing Integrated circuits, said system comprising:
    means for preparing a first macro having a first power consumption rate; and
    means for preparing a second macro having a second power consumption rate different than said first power consumption rate,
    wherein said first macro and said second macro have the same function, the same internal devices, and different internal connections.

16. The system in claim 15, wherein said first macro and said second macro are substituted for one another.

17. The system in claim 16, wherein said first macro and said second macro are substituted for one another only if performance characteristics indicate that substituting would improve in said integrated circuits.

18. The system in claim 17, wherein said performance characteristics include operating speed and power consumption.

19. The system in claim 15, wherein said first macro and said second macro comprise a single design having different wiring connections between elements within said single design.

20. The system in claim 19, wherein said different wiring connections change an operating speed and a power consumption of said first macro when compared with said second macro.

* * * * *